United States Patent [19]
Meyer

[11] Patent Number: 5,672,812
[45] Date of Patent: Sep. 30, 1997

[54] SPARKPLUG/PRESSURE SENSOR DEVICE

[75] Inventor: Roy C. Meyer, Milwaukee, Wis.

[73] Assignee: Southwest Research Institute, San Antonio, Tex.

[21] Appl. No.: 541,331

[22] Filed: Oct. 10, 1995

[51] Int. Cl.⁶ .................................... G01L 23/22
[52] U.S. Cl. .................. 73/35.07; 313/118; 313/122; 313/135; 324/381; 324/402
[58] Field of Search .................. 73/35.07, 35.08, 73/35.12, 115, 722, DIG. 2; 313/118, 122, 135, 155; 324/379, 381, 402

[56] References Cited

U.S. PATENT DOCUMENTS

| | | | |
|---|---|---|---|
| 2,879,450 | 3/1959 | Baker | 73/35.12 |
| 4,106,447 | 8/1978 | West | 123/117 |
| 4,138,783 | 2/1979 | Portier | 73/DIG. 2 |
| 4,161,665 | 7/1979 | Buck et al. | 73/DIG. 2 |
| 4,408,496 | 10/1983 | Dahle et al. | 73/728 |
| 4,463,610 | 8/1984 | Anderson, III et al. | 73/654 |
| 4,602,506 | 7/1986 | Sawamoto et al. | 73/115 |
| 4,736,620 | 4/1988 | Adolph | 73/35 |
| 4,823,621 | 4/1989 | Sobel et al. | 73/862 |
| 4,909,071 | 3/1990 | Amano et al. | 73/115 |
| 4,969,352 | 11/1990 | Sellnau | 73/115 |
| 5,101,659 | 4/1992 | Takeuchi | 73/115 |
| 5,142,914 | 9/1992 | Kusakabe et al. | 73/115 |
| 5,165,284 | 11/1992 | Shoji et al. | 73/DIG. 2 |
| 5,180,983 | 1/1993 | Murata et al. | 324/402 |
| 5,269,178 | 12/1993 | Vigmostad et al. | 73/DIG. 2 |
| 5,303,595 | 4/1994 | Shoji et al. | 73/DIG. 2 |
| 5,315,875 | 5/1994 | Benedikt et al. | 73/115 |
| 5,323,643 | 6/1994 | Kojima et al. | 73/115 |
| 5,479,817 | 1/1996 | Suzuki et al. | 73/115 |

Primary Examiner—Richard Chilcot
Assistant Examiner—Eric S. McCall
Attorney, Agent, or Firm—Gunn, Lee & Miller, P.C.

[57] ABSTRACT

A pressure transducer suitable for use in measuring the pressures created by the combustive events that occur in internal combustion engines. The transducer utilizes the magnetostrictive effect to measure stress waves present in magnetized metallic components associated with sparkplug devices typically placed in apertures into internal combustion engine cylinders. The present invention includes a replacement sparkplug device that incorporates a pickup coil for measuring magnetostrictive events within the magnetized metal components of the sparkplug device and alternatively a sparkplug boot cover that separately incorporates a removable pickup coil for measuring the stress waves. In either embodiment, the present invention utilizes the magnetostrictive sensor signals measured as a basis for identifying internal combustion cylinder pressures and for identifying the characteristics of the ignition events within the cylinder. The invention incorporates electronic components appropriate for multiplexing, amplifying, and filtering signals from a number of cylinders within a engine and analyzing and processing this information in a manner that allows both the identification of problems associated with combustion in the engine and, in some cases, the correction of these problems on a realtime feedback basis.

3 Claims, 3 Drawing Sheets

SPARKPLUG/PRESSURE SENSOR DEVICE

BACKGROUND OF THE INVENTION

1. Field of The Invention

The present invention relates generally to devices for monitoring, measuring, and evaluating internal combustion engine ignition events. The present invention relates more specifically to devices for sensing, measuring, and analyzing the combustion characteristics, including combustion pressures, of individual cylinders in an internal combustion engine. The present invention, in particular, applies to both retrofit devices that may be installed in conjunction with existing sparkplugs and to replacement sparkplug devices that incorporate the novel structures of the present invention.

2. Description of the Prior Art

Informative data regarding the operation and physical condition of internal combustion engines, especially regarding the combustion process itself, is desirable and important for a number of reasons. First, it is one goal of engine design to create an engine that possesses both high efficiency and high power output. Critical to engine efficiency and output are the characteristics of the combustion event from which derive the forces necessary for producing the rotational torque of the engine. The starting point, therefore, for any analysis of the efficient conversion of combustion energy into the torque necessary to drive a vehicle begins with an understanding of the pressures, temperatures, timing, and other variables associated with the combustion event.

A second important reason for obtaining information on the combustion characteristics within an engine derives from the need to track engine deterioration over its operational lifetime. As engine wear and mechanical fatigue progress during the life of an internal combustion engine, the efficiency of the engine changes, often in ways that can be compensated for if these changes can be identified and tracked. Once again, a primary source of information about the efficiency of an engine, in this case over its deteriorating lifetime, lies in an analysis of the specific realtime combustion characteristics and the changes in those characteristics that occur over time. In the laboratory setting, the above information is often acquired from in-cylinder pressure measurements and analysis. These laboratory techniques, however, are often impractical because of the high cost of suitable pressure transducers that can be incorporated into the internal combustion cylinders. The high temperatures and pressures that normally occur within an engine cylinder can prevent the use of more fragile, less costly pressure transducers. To get away from the direct measurement of the high pressures and temperatures, and thus the high cost of the sensor systems required, many existing engine management systems instead measure other parameters and then infer what the combustion characteristics must have been.

While efforts in the laboratory to measure engine efficiency and output by measuring and analyzing combustion pressures and characteristics have been hampered by the lack of suitable, low-cost pressure transducers, the same effort outside of the laboratory has been hampered to an even greater extent because of the difficulty converting the types of transducers and sensors utilized in the laboratory into on-board monitoring systems capable of withstanding the combustion temperatures and pressures over a more prolonged period of time. Whatever progress has been made in measuring and utilizing combustion pressures to evaluate engine performance in the laboratory has been slow to translate into similar monitoring systems in the real world.

If a reliable, low-cost, in-cylinder pressure sensor were available, much real-time information on the combustion process could be gathered and many engine control input parameters could be immediately improved. An array of individual, in-cylinder pressure sensors could be used to provide accurate information on an entire range of critical values. These values include: indicated mean effective pressure (MEP) measurements, burn pressure phasing, peak pressure determinations, engine knock sensing, engine misfire detection, power efficiency determinations, cylinder-by-cylinder control of engine firing, over all ignition process detection, and a variety of other similar combustion event characteristics.

It is well known in the art to utilize combustion pressure characteristics, however they might be measured, to analyze and improve the efficiency, output, and deterioration character of an engine or of a particular combustion cylinder within an engine. Representative applications of such pressure data are described in John B. Heywood, *Internal Combustion engine Fundamentals*, Section 9.2.2 Analysis of Cylinder Pressure Data (1988). What is not known in the art is a device for continuously acquiring this information in a low-cost, efficient, and accurate fashion. Even more remote in the field is the ability to translate systems for obtaining these measurements from the laboratory to the typical automotive engine on the street.

More recent sensor technologies, including some that utilize the magnetostrictive effect, have been shown in other fields to provide a sensitive means for mechanical stress wave measurement in both metallic and non-metallic structures. Some limited application of these magnetostrictive devices has been made in the field of internal combustion engines and, in particular, to gross measurements of the occurrence of combustion events. These previous efforts may be typified by the following:

U.S. Pat. No. 4,736,620, issued to Adolph on Apr. 12, 1988, entitled "Magnetostrictive Element for Measuring Knocking Engines" describes the use of a magnetostrictive element to detect self-ignition or "knocking" in the combustion cycle. A plurality of sensor devices are connected by way of mechanical wave guides or wires to each of the combustion chambers within an engine. The ability of these devices to gather information, however, is strictly limited to the detection of a knocking event within a specific cylinder and, over all, the system does not lend itself to easy installation on existing engines or, for that matter, versatility in its ability to characterize combustion characteristics other than simply the occurrence of combustion.

U.S. Pat. No. 2,534,276, issued to Lancor on Dec. 19, 1950, entitled "Vibration Pick-Up Device and System" describes an early magnetostrictive-type vibration sensor utilized to detect impact, shock, or detonation. This device functions much like an accelerometer and is mounted in an engine's cylinder wall. Here again, the vibration sensor is limited in that it gathers information relevant only to the occurrence or non-occurrence of a combustive event and little, if anything, about the pressures or other physical characteristics associated with the event.

U.S. Pat. No. 4,823,621, issued to Sobel, et al, on Apr. 25, 1989, entitled "Magneto Elastic Force Transducer" describes a transducer comprised of two cylindrical bodies with a hollow magnetic core held together by a force transmitting bolt. The device measures a force exerted on the centralized stud bolt through the magnetostrictive effect exhibited by the stresses traveling through the stud bolt.

U.S. Pat. No. 4,408,496, issued to Dahle, et al, on Oct. 11, 1983, entitled "Pressure Sensing Transducer" describes a device that utilizes magnetostrictive characteristics to measure the pressure in the cylinder of an internal combustion engine, more specifically of a diesel engine (without sparkplugs).

While the above patents represent that some effort has been made to utilize magnetostrictive effect based sensors in engine analysis, it is clear that such use has, to date, been quite limited, especially as it relates to incorporating such measurement capabilities into spark plug devices. The limitations on such use derive from the fact that the sensor structures and methods disclosed heretofore have been unable to isolate and interpret anything other than the gross occurrence of combustion events. Other previous attempts describe systems that are only able to measure pressure characteristics of combustion events under laboratory conditions for short periods of time.

Where the magnetostrictive effect has been considered for making pressure measurements of combustive events in internal combustion engines, it has been significantly limited by the inability to provide low cost and accurate mechanisms for making the necessary measurements. Prior attempts to make such pressure measurements have been limited strictly to the laboratory environment and have not translated into devices appropriate for the constant monitoring of the combustion event over the life of the engine.

It would, therefore, be advantageous to develop an apparatus for detecting, measuring, and analyzing combustion characteristics within an internal combustion engine with a sensitivity that allows a more thorough understanding of engine efficiency, output, and operational characteristics that are inherent in the engine design, or that derive from the deteriorating effects of engine use. It would be desirable to have such an apparatus that could function in an analytical setting where the then existing engine output, efficiency, and combustion characteristics could be determined. On the other hand, it would also be advantageous if such an apparatus could be implemented in a monitoring mode where information on the combustive characteristics of an engine could be gathered during the ongoing, long-term operation of the engine and either retained for later analysis or used for continuous comparison with baseline values in a manner that would allow the immediate signaling of problems. Further, it would be advantageous to have such an apparatus that would permit use of the information in a feedback compensation arrangement where engine management control systems could modify engine characteristics so as to compensate for measured changes.

BACKGROUND OF THE MAGNETOSTRICTIVE EFFECT

The magnetostrictive effect is a property peculiar to ferromagnetic materials. The magnetostrictive effect refers to the phenomena of physical, dimensional change within a material associated with variations in magnetization. The effect is widely used to make vibrating elements for such things as sonar transducers, hydrophones, and magnetostrictive delay lines for electric signals.

The magnetostrictive effect actually describes physical/magnetic interactions that can occur in two directions. The Villari effect occurs when stress waves or mechanical waves within a ferromagnetic material cause abrupt, local dimensional changes in the material which, when they occur within an established magnetic field, can generate a magnetic flux detectible by a receiving coil in the vicinity. The Joule effect, being the reverse of the Villari effect, occurs when a changing magnetic flux induces a mechanical vibrational motion in a ferromagnetic material through the generation of a mechanical wave or stress wave.

Typically, the Joule effect is achieved by passing a current of varying magnitude through a coil placed within a static magnetic field thereby modifying the magnetic field and imparting mechanical waves to a ferromagnetic material present in that field. These waves then propagate not only through the portion of the ferromagnetic material adjacent to the generating coil but also into and through any further materials in mechanical contact with the ferromagnetic material.

Application of the Villari effect typically involves placing a coil about a ferromagnetic material subjected to an established magnetic field and measuring variations in the magnetic field caused by mechanical stress waves propagating through the ferromagnetic material. As long as these stress waves communicate into the ferromagnetic core material, as from any non-ferromagnetic material in mechanical contact with the core material, the waves can be detected using the magnetostrictive sensor coil. In this way, non-ferromagnetic materials can serve as conduits for the mechanical waves or stress waves that can thereafter be measured by directing the waves through these ferromagnetic "wave guides" placed proximate to the magnetostrictive sensor element.

The advantages of magnetostrictive sensors over other types of vibrational sensors becomes quite clear when the structure of such sensors is described. All of the components typically utilized in magnetostrictive sensors can be made temperature, pressure, and environment resistant in ways that many other types of sensors, such as piezoelectric based sensors, can not. High temperature permanent magnets, magnetic coils, and ferromagnetic materials are quite easy to produce in a variety of configurations. In addition, although evidence from the previous applications of magnetostrictive sensors would imply otherwise, magnetostrictive sensors are capable of detecting low amplitude mechanical waves and translating them into signals that are subject to very free analysis and discrimination in a manner that allows very accurate and detailed information to be obtained about the combustive events in an engine that have initially generated the stress.

SUMMARY OF THE INVENTION

It is, therefore, an object of the present invention to provide an apparatus for measuring the in-cylinder pressures of an internal combustion engine for the purpose of evaluating engine operational characteristics.

It is another object of the present invention to provide an apparatus for long-term monitoring of the combustion characteristics, especially combustion pressures, of an internal combustion engine.

It is another object of the present invention to provide an apparatus for the collection and analysis of information regarding combustion characteristics within an internal combustion engine, the use of that information to detect inefficiencies in the operation of the engine, and the identification of anomalous events that indicate the deterioration of the engine, all of such information facilitating either immediate correction and/or compensation of such effects or the signaling of engine problems to an engine operator.

It is another object of the present invention to provide a means for detecting, measuring, and analyzing the in-cylinder pressures of an internal combustion engine, which means may retrofit to existing spark plug structures or may be incorporated into customized spark plug devices for use in standard internal combustion engines.

In fulfillment of these and other objectives, the present invention provides a magnetostrictive sensor positioned in mechanical contact with a standard sparkplug device for a single cylinder of an internal combustion engine. The magnetostrictive sensor is capable of translating stress from mechanical waves received through the ferromagnetic material contained in the standard sparkplug device into an electrical signal whose frequency, amplitude, and timing characteristics are indicative of combustion pressures generated within the cylinder. The present invention provides a means for accurately characterizing a stress wave so measured as being directly related to combustive pressures of particular amplitudes. The present invention permits a retrofit of the sensor to existing sparkplug structures or the incorporation of the sensor technology into a customized sparkplug device that fits into standard internal combustion engine sparkplug apertures. The present invention permits investigation of internal combustion characteristics in this manner on either a one-time "snapshot" basis or on a continuous monitoring basis. The present invention provides such a sensor in a low cost yet durable construction that is easily incorporated into existing engine system management configurations.

DETAILED DESCRIPTION OF THE PREFERRED EMBODIMENT

As generally described above, the apparatus of the present invention can be implemented in a number of environments, depending upon the specific type of information to be gathered and the period of time over which the information is monitored. The apparatus of the present invention, may be arranged in a laboratory setting or in a technical engine repair shop setting wherein access to the engine while operating is possible without motion of the vehicle itself. In such a case, the elements and components of the present invention, as described in more detail below, could be positioned in temporary fashion on existing sparkplug structures, or in temporary fashion through the substitution of standard sparkplugs with customized sparkplug structures suitable for such immediate data analysis.

The same invention, however, could also be configured in a manner that allows its incorporation on board a potentially mobile vehicle with sensors placed in association with each combustion cylinder for the engine. In an on-board configuration, the information would be gathered in a monitoring mode and, with certain limited display capabilities and/or analytical capabilities, could be utilized to track the combustion characteristics of the engine over time, to report on these characteristics as necessary, and in some situations to direct corrective action to modify engine characteristics in response to the combustion pressure data gathered.

Figure 1:
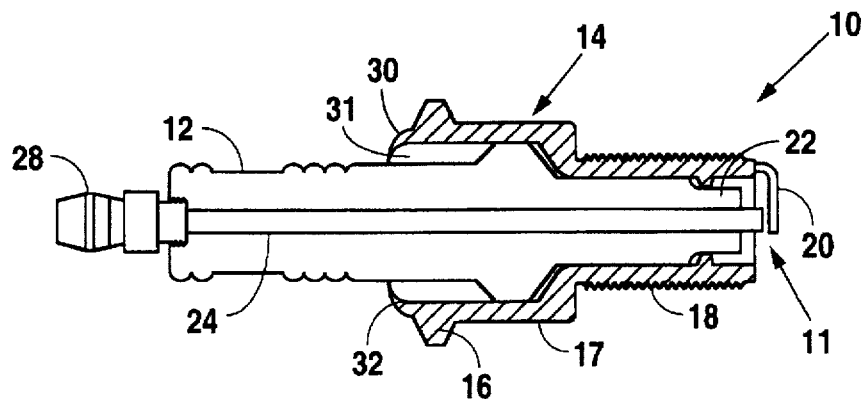
FIG. 1 is a cross-sectional view of a sparkplug structure representative of the prior art for the present invention.

Reference is first made, therefore, to FIG. 1 for a preliminary description of the basic structure of standard sparkplug devices in anticipation of incorporating the elements of the present invention thereto. FIG. 1 shows a typical sparkplug device (10) for an internal combustion engine that is usually inserted into a threaded aperture on the cylinder head of the engine itself. Typically, sparkplug (10) provides a high voltage electrode gap (11) across which a current spark may flow at intervals appropriate for the firing of the engine cylinder. In FIG. 1, sparkplug (10) is comprised primarily of a ceramic core structure (12) surrounded by metal collar (14). Collar (14), typically constructed of zinc-plated, high-quality steel, itself is comprised of hexagonal nut section (16), center section (17), and threaded section (18). Installation of sparkplug (10) involves matching a sparkplug wrench (not shown) to hexagonal nut section (16) and threading threaded section (18) into a standard threaded aperture in the engine head.

The spark in the sparkplug occurs at spark gap (11) between electrode (20) which derives from metal collar (14) by way of threaded section (18), and electrode (24) which is coaxially centered in ceramic core structure (12) and terminates on one end of structure (12) near electrode (20) through ceramic cone section (22). The electrodes are typically nickel alloys, although precious metals are sometimes used. The ceramic material of cone section (22), typically a fired aluminum oxide composition, serves to insulate electrode (24) from the surrounding metal of threaded section (18) at all points except at gap (11) between electrode (24) and electrode (20). It is at gap (11) that the spark occurs and the air\gas mixture in the engine chamber begins to ignite. Current to the standard sparkplug is provided by way of a complete circuit between a ground voltage at metal collar (14) by way of its insertion into the metallic cylinder head, and spark plug wires (not shown) connected at the termination of electrode (24) at sparkplug post (28).

Ceramic core structure (12) is held captive within metal collar (14) by way of gas-tight seal (31), typically formed from an aluminum oxide sillment, and by formed lip (32) which extends from nut section (16) of metal collar (14). Electrode (24) is held within ceramic core (12) in a similar fashion with a sillment seal (not shown).

Figure 2:
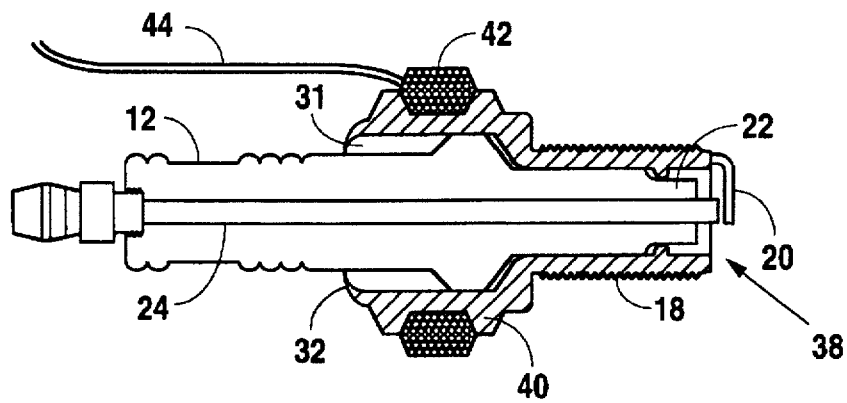
FIG. 2 is a cross-sectional view of a first preferred embodiment of the sparkplug structure of the present invention.

Reference is now made to FIG. 2 for a detailed description of a first preferred embodiment of the present invention. The configuration of a sparkplug sensor device appropriate for the replacement of a standard plug and which incorporates the elements of the present invention is shown generally as (38) in FIG. 2. The components of sparkplug (38) that carry out the spark and ignition of the gas/air mixture in the chamber are essentially the same as in the prior art shown in FIG. 1. The distinction in the implementation of the present invention lies in the replacement of metal collar (14) in FIG. 1 with magnetized metal collar (40), shown in FIG. 2. Magnetized metal collar (40) is configured so as to create a substrate base upon which coil winding (42) can be wound. Coil winding (42) in the preferred embodiment is constructed with 50 windings of 36 gauge magnetic polytheraeze insulated wire. The terminal ends of coil winding (42) are directed away from sparkplug (38) by way of conductors (44). Otherwise, the structure of sparkplug (38) remains much the same as sparkplug (10) in FIG. 1. Sparkplug post section (12) is comprised of elements nearly identical in structure, such that the same standard plug wires (not shown) might be utilized in the operation of the modified plug design.

As placed within an engine cylinder head, sparkplug (38) positions magnetized threaded section (18) in the block so as to present a generally circular face comprising electrode (20), electrode (24), and ceramic cone (22) towards the interior of the combustion chamber. The forces of combustion, therefore, are directed outward against the face of ceramic cone (22) and, to some extent, threaded section (18), and electrodes (20) and (24). Resistance to this expansive force is, of course, maintained by threaded section (18) in its adherence to the cylinder head walls as a threaded aperture. It may also be seen, however, that forces against ceramic section (12) must be resisted by the internal adherence of ceramic section (12) to magnetized metal collar (40), gas-tight seals (31), and formed lip (32).

The stresses associated with the forces from the combustion event, therefore, are transferred from ceramic section (12) into metal collar (40) where, within the static magnetic field established, they generate the typical magnetostrictive effect. This magnetic flux aspect of the magnetostrictive effect can then be detected by coil winding (42) in the standard fashion described above. Because the primary source of mechanical waves within metal collar (40) is the combustive event, much can be learned from the characteristics of these stress waves within metal collar (40) about the combustive event itself. More specifically, an accurate measure of the pressures within the combustion cylinder can be made after reference measurements for representative combustions and pressures, are taken, and a specific indexing of magnetostrictive signal levels against internal combustion pressures is established. Means for alternatively calculating the combustion pressures can be used once the sensor response has been characterized and referenced.

Implementing the embodiment shown in FIG. 2 involves the replacement of a standard sparkplug device with the device specifically configured for the present invention. This device lends itself to either a one-time "snapshot" analysis of the combustion characteristics of a particular cylinder of an engine or to the on-board monitoring of such characteristics during continuous engine operation. Terminal leads (44) would be directed, as described in more detail below with respect to FIG. 4, to appropriate circuitry for the amplification, filtering, analysis, and possible display of the received signal. Again, it is anticipated that sparkplug/sensor (38) might be individually used to analyze the combustion characteristics of each of the cylinders in an engine, one at a time, as in a sophisticated automotive repair shop, or sparkplug/sensor (38) may be implemented in conjunction with other similar sparkplug devices to form an array of magnetostrictive sensors, each of which may be separately interrogated or all of which may be interrogated in sequence in conjunction with timing information for the engine.

Figure 3:
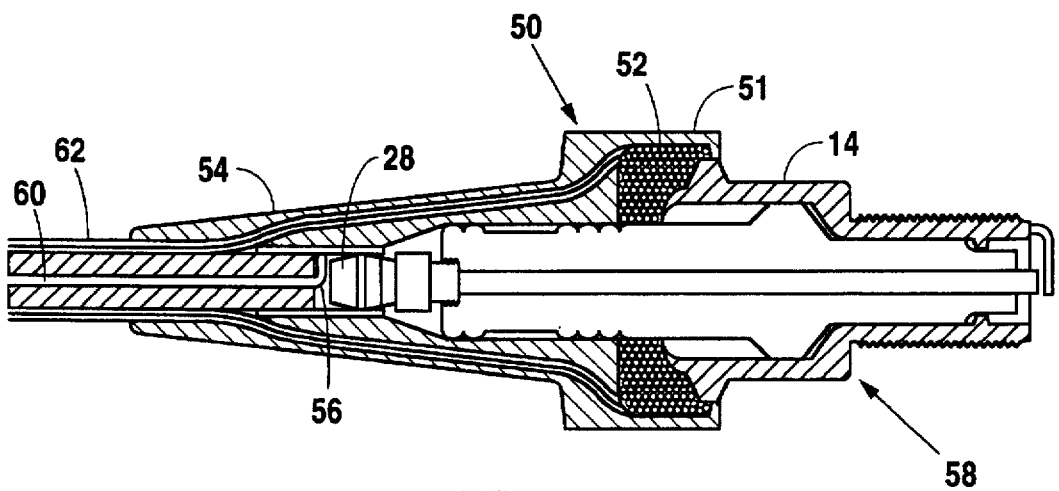
FIG. 3 is a cross-sectional view of a second preferred embodiment for the sparkplug structure of the present invention.

Reference is now made to FIG. 3 for an alternate preferred embodiment of the present invention. In some cases, it is not possible or desirable to replace the standard sparkplug device with one specifically configured to implement the elements of the present invention. FIG. 3 describes an alternative approach whereby all of the necessary components to implement the present invention are incorporated into a sparkplug connector rather than in a new sparkplug unit, in a manner that continues to allow measurement of the magnetostrictive signals generated by the stress waves present in the metallic sparkplug collar. Sparkplug (48) in FIG. 3 is, as indicated, a sparkplug of standard configuration with metal collar (14) magnetized, but with the balance of the sparkplug structure similar to that shown in FIG. 1. Again, the forces on sparkplug (48) are directed longitudinally along the length of sparkplug (48) in a manner that tends to force it from the cylinder head where it is threaded into place. These forces translate into stress waves within the ceramic components of the sparkplug and within magnetized metal collar (14).

Typically, sparkplug wires, i.e., the electrical conductors that carry the high voltage current from the distributor or from the electronic ignition system to the individual sparkplugs, are comprised of well-insulated cables with centralized high-carbon conductors that terminate with insulated plastic boots that cover and surround the post of a standard sparkplug. The electrical conductor within the wire terminates in what is typically a cylindrical press-on connector that surrounds sparkplug post (28) and, thereby, conducts current from the sparkplug wire into the sparkplug through electrode (24). Once again, completion of the electrical circuit is achieved by a ground connection through the engine block to metal collar (14). The insulating boot that typically terminates a sparkplug wire serves a number of purposes. Not only does the boot keep the sparkplug post terminal clean and in electrical contact with the sparkplug wire, but it also serves to center the connector on the sparkplug post to facilitate the insertion and removal of the sparkplug wire.

In the present invention, the necessary coil windings for the magnetostrictive sensor are incorporated into the sparkplug wire boot. As seen in FIG. 3, sparkplug wire boot (50) is comprised of post boot section (54) and metal collar boot section (51). Whereas a normal sparkplug wire boot might terminate with post boot (54), the boot of the present invention extends beyond this point so as to enclose and partially surround metal collar (14). This facilitates the positioning of coil windings (52) adjacent to magnetized metal collar (14) where they can pick up, by way of the magnetostrictive effect, the stress waves that are present in magnetized metal collar (14). Coil wire terminal ends (62) are molded into post boot (54) in a manner that directs conductors (62) away from sparkplug/sensor (58). As described above, sparkplug boot (50) is attached to sparkplug wire (58) which directs coaxial conductor (60) to a point where it contacts metal connector (56) which itself surrounds and contacts sparkplug post (28).

The magnetostrictive sensor function of the preferred embodiment shown in FIG. 3 is identical to that of the embodiment shown in FIG. 2. Stresses generated by the combustive event are communicated into magnetized metal collar (14) and may thereby be measured through the magnetostrictive effect by coil windings (52). The signal generated within coil windings (52) is carried by way of conductor (62) to the appropriate circuitry described in more detail below. The embodiment in FIG. 3 lends itself to a more permanent installation in an automotive engine where on-board monitoring of each of the cylinders can be maintained throughout the life of the engine. The embodiment in FIG. 3 also lends itself to a method of retrofitting existing engines in a manner that does not require the substitution of sparkplugs but only requires the replacement of the sparkplug cables connected to the plugs.

Figure 4:
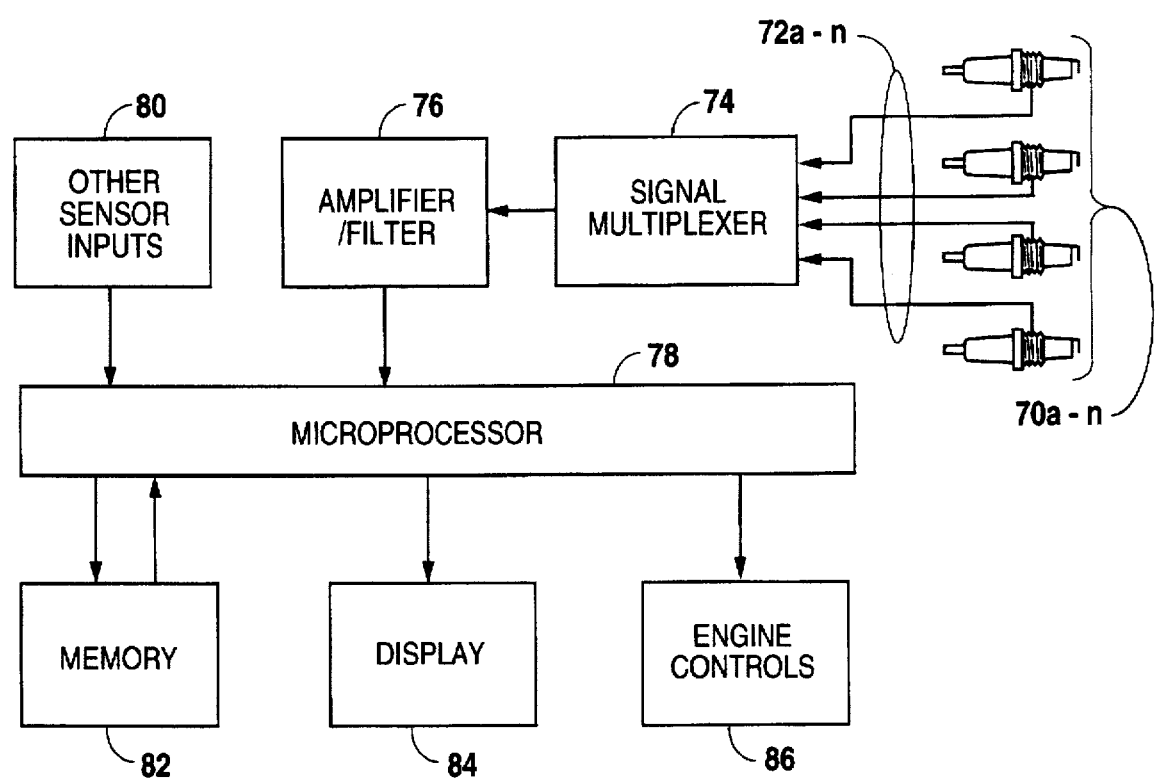
FIG. 4 is a schematic block diagram showing the primary elements of the apparatus of the present invention and their functional relationship.

Reference is now made to FIG. 4 for a detailed description of the system components designed to receive and analyze the signals generated by the various sensor configurations described above. In FIG. 4, sparkplug sensors (70a–n), each configured as described above, direct magnetostrictive sensor signals out to the circuitry of the invention by way of conductors (72a–n). In a preferred embodiment, each cylinder of an engine under analysis incorporates a separate magnetostrictive sensor (70a–n) and each of the conductors (72a–n) terminates in signal multiplexer device (74). Multiplexer (74) is capable of combining the signals in timed fashion from each of sensor sparkplugs (70a– n) in a manner that can then be interpreted by the balance of the components of the invention.

The multiplexed signal is then amplified and filtered by amplifier\filter (76) and presented to microprocessor (78) for analysis. This analysis includes a measurement of the amplitude and duration of the magnetostrictive sensor signal associated with each combustive event. To facilitate the identification of a particular signal and to confirm its association with a particular engine cylinder, other sensor inputs (80) could be received by microprocessor (78) and used to accurately track the information received from the magnetostrictive sensors. Typically, these other sensor inputs (80) provide such information as the timing and firing sequence of the engine that microprocessor (78) then compares with the timing sequences presented through multiplexer (74). It is understood that multiplexer (74) maintains some identification of each discreet magnetostrictive signal as it is received from the respective magnetostrictive sensor (70a–n) and presents this identification in conjunction with the magnetostrictive signal to microprocessor (78) for analysis. Other relevant information that bears upon the interpretation of the magnetostrictive sensor signal associated with the combustion events might optionally include engine temperature, operating RPM, torque, fuel richness, and other engine operational values.

Microprocessor (78) carries out a comparison of signal amplitudes, frequencies, and patterns with similar values stored in memory (82) and previously correlated with combustion pressures, burn rates, timing, etc. Alternatively, microprocessor (78) uses algorithms previously defined to correlate signal characteristics with combustion pressure. As a pressure traducer, a simple direct correlation between a burn event signal amplitude and the combustion pressure is possible. The analysis arrives at these combustion characteristic values according to well known techniques, such as those descried in Heywood, referenced above.

Figure 5:
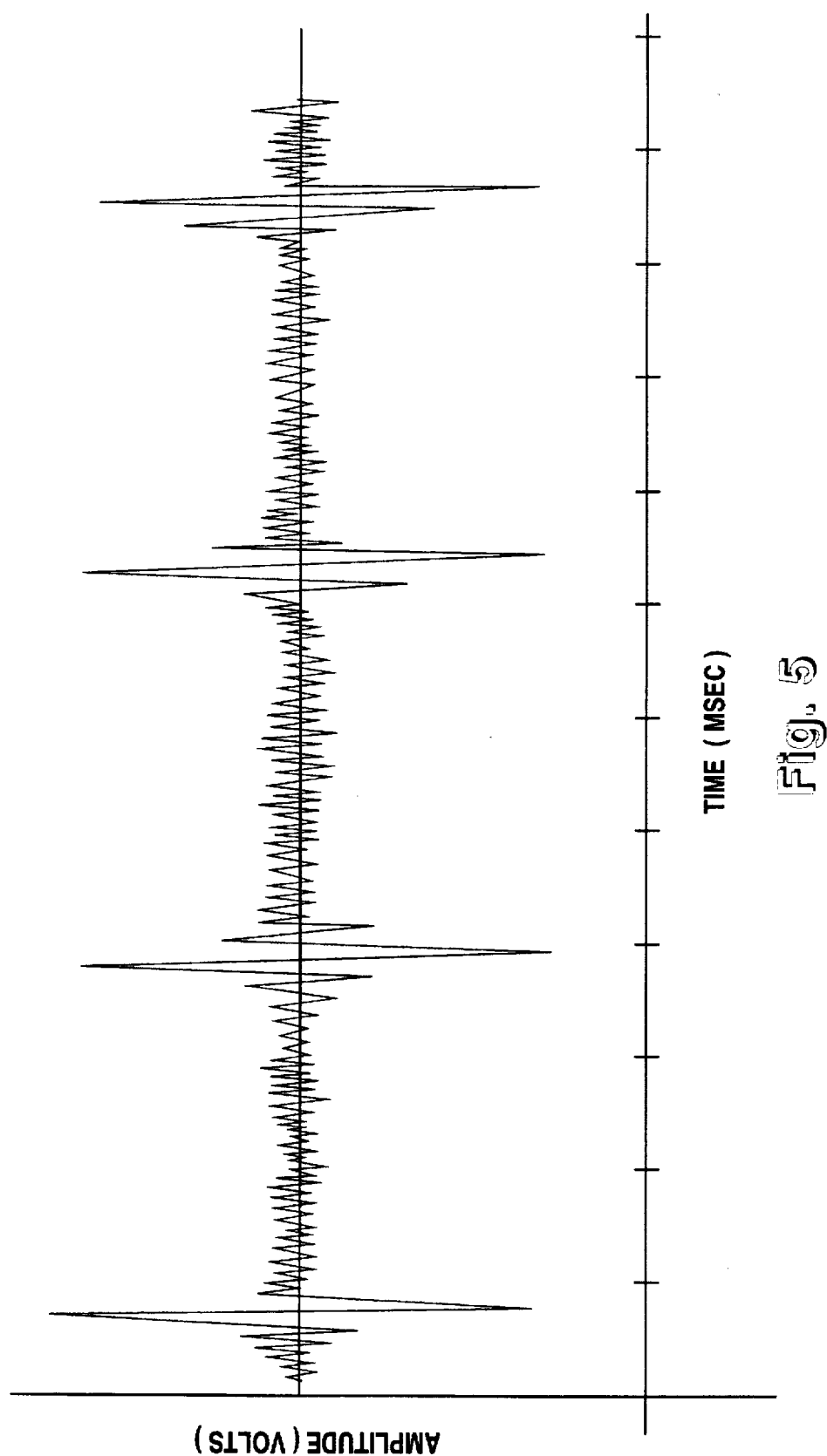
FIG. 5 is a graphic representation of a typical signal produced by the sensor system of the present invention from which pressure measurements may be made.

After a determination of combustion pressures and burn characteristics, microprocessor (78) provides this information numerically and/or graphically to a test or vehicle operator by way of display (84). In a monitoring mode, display (84) may simply be a digital readout or even an array of indicator lights. In a more technical analysis of the combustion event, display (84) may be a video display terminal capable of providing signal graphics such as that shown in FIG. 5. The apparatus of the present invention derives a signal, such as shown in FIG. 5, of sufficient resolution to allow not only discreet amplitude measurements to be made, but also to allow sophisticated pattern recognition techniques to identify specific combustion characteristics.

In addition to providing displayed information, microprocessor (78) may, when appropriate, direct compensatory action through engine controls (86). In the preferred embodiment, this takes the form of directing a modification of the cylinder ignition timing or a modification of the fuel mixture. Various other engine controls that effect or depend upon engine timing or power output might also be affected by microprocessor (78) in similar fashion.

An accurate measure of the combustion pressure can be made simply from a measurement of the amplitude and timing of the magnetostrictive sensor signal. More refined analysis of the combustion characteristics may be achieved through the incorporation of additional information such as described above (fuel richness, engine temperature, etc.) that can then not only characterize internal combustion pressures but also completeness of burn and other factors relevant to the efficiency and output of the engine. The primary objectives in the present invention, however, are achieved simply by amplifying the sensor output and integrating the output signal over time, to produce a value that is directly proportional to the cylinder pressure. This value may then be used in traditional methods of analysis such as those described in Heywood, referenced above.

In addition to making pressure measurements of the combustion within the engine cylinder, the present invention is capable of acting as a magnetostrictive sensor component for a more complex engine analysis system. It is anticipated that the present sensor could be used as a means for identifying the occurrence and timing of engine misfire and engine knock, as well as various other events and characteristics associated specifically with the ignition and combustion of gasses within the cylinder.

Derived through multiplexer (74), amplifier\filter (76), and microprocessor (78), information regarding the firing or misfiring of a particular cylinder and the complete or incomplete combustion within that cylinder, would, for example, allow microprocessor (78) to determine that the ignition timing control system is inadequate or misadjusted with respect to a particular cylinder. This could be as a result of the deterioration of the engine over time or could derive from the failure of some component within the ignition system. Whatever the case, the sensor of the present invention can act as a monitoring sensor that controls compensatory action on the engine without the need for human intervention and analysis.

It is intended that the above description of a first and second preferred embodiment of the structure of the present invention and the description of one implementation of the present invention into an over-all engine management system for an internal combustion engine, are but one or two enabling best mode embodiments for implementing the invention. Other applications are likely to be conceived of by those skilled in the art, which applications still fall within the breadth and scope of the disclosure of the present invention. It is anticipated that other internal combustion engines such as diesel engines which do not normally require ignition sparkplugs in the same fashion as gasoline-powered internal combustion engines, could still benefit from the application of the present invention through its utilization on such devices as diesel glow plugs or any other components that project into the combustion chamber in a manner that allows the stresses associated with the force derived from the combustion event to act upon ferromagnetic material. The primary import of the present invention, however, lies again in its ability to be configured in association with standard sparkplug devices and/or slightly modified sparkplug devices. The benefits derive from the versatility of application of the present invention and its low cost and accuracy. Again, it is understood that other applications of the present invention will be apparent to those skilled in the art upon a reading of the above description of the preferred embodiments and a consideration of the appended claims and drawings.

I claim:

1. A transducer for measuring stress waves indicative of characteristics of combustive events present within an internal combustion engine, said transducer comprising:

a ceramic cylinder;

a first electrode coaxially surrounded by said ceramic cylinder, and exposed at both a first and second end of said ceramic cylinder;

a magnetized ferromagnetic collar surrounding and adhered to a section of said ceramic cylinder, said collar comprising a threaded section appropriate for insertion into threaded apertures present in internal combustion engine cylinder heads, and a bolt section appropriate for receiving standard sparkplug wrenches in a manner that allows said transducer to be inserted into said cylinder head;

a second electrode electrically conductive with and attached to said magnetized ferromagnetic collar, said second electrode positioned near said second end of said ceramic cylinder to form a spark gap between said first and second electrodes; and a wire coil wound on a bobbin, said bobbin removably surrounding said magnetized ferromagnetic collar, said wire coil terminating in signal conductors directed away from said transducer, said wire coil and said bobbin encased in a pliable boot, said boot configured to receive said first end of said ceramic cylinder and said first electrode exposed therein, and to position said coil around said magnetized ferromagnetic collar, said boot further encasing said signal conductors and directing said conductors away from said transducer;

wherein said combustive events impart stress waves into said ceramic cylinder and said stress waves travel into said magnetized ferromagnetic collar and therein generate magnetic field fluctuations that in turn generate current flow in said wire coil, the said current flow having timing and amplitude characteristics indicative of said characteristics of said combustive events.

2. A transducer for measuring stress waves indicative of characteristics of combustive events present within an internal combustion engine and capable of being installed in association with a standard sparkplug device utilized in internal combustion engines, said transducer comprising:

a bobbin, said bobbin having dimensions appropriate for placement around a magnetized ferromagnetic portion of said sparkplug device normally exposed after insertion of said sparkplug device into said internal combustion engine;

a wire coil wound around said bobbin and terminating in signal conductors directed away from said transducer;

a pliable boot, said boot configured to receive said exposed portion of said sparkplug device, and to position said coil around said magnetized ferromagnetic portion of said sparkplug device, said boot further encasing said signal conductors and directing said conductors away from said transducer;

wherein said combustive events impart stress waves into said sparkplug device and said stress waves travel into said magnetized ferromagnetic portion of said sparkplug device and therein generate magnetic field fluctuations that in turn generate current flow in said wire coil, said current flow having timing and amplitude characteristics indicative of said characteristics of said combustive events.

3. The transducer of claim 2 wherein said pliable boot further surrounds and directs a conductor to said sparkplug device, said conductor providing a current flow appropriate for generating a spark on said sparkplug device, said boot positioning said conductor so as to contact a terminal end of said sparkplug device.

* * * * *